US012792789B2

(12) United States Patent
Ando et al.

(10) Patent No.: US 12,792,789 B2
(45) Date of Patent: Nov. 10, 2026

(54) DEVICE SECURITY SHIELD STRUCTURE

(71) Applicant: CONNECTEC JAPAN Corporation, Myoko-city Niigata (JP)

(72) Inventors: Mamoru Ando, Myoko-city Niigata (JP); Yasuhiko Kutsuzawa, Myoko-city Niigata (JP); Hidekazu Machida, Myoko-city Niigata (JP)

(73) Assignee: CONNECTEC JAPAN Corporation, Myoko-city (JP)

( * ) Notice: Subject to any disclaimer, the term of this patent is extended or adjusted under 35 U.S.C. 154(b) by 0 days.

(21) Appl. No.: 19/151,623

(22) PCT Filed: Mar. 13, 2023

(86) PCT No.: PCT/JP2023/009627

§ 371 (c)(1),
(2) Date: Jul. 29, 2025

(87) PCT Pub. No.: WO2024/161664

PCT Pub. Date: Aug. 8, 2024

(65) Prior Publication Data

US 2026/0228370 A1 Aug. 6, 2026

(30) Foreign Application Priority Data

Jan. 30, 2023 (JP) ................................ 2023-012188

(51) Int. Cl.

| | |
|---|---|
| ***G06F 21/87*** | (2013.01) |
| ***G06F 21/73*** | (2013.01) |
| ***G06F 21/75*** | (2013.01) |
| ***G06F 21/76*** | (2013.01) |

(52) U.S. Cl.

CPC .............. *G06F 21/87* (2013.01); *G06F 21/73* (2013.01); *G06F 21/75* (2013.01); *G06F 21/76* (2013.01)

(58) Field of Classification Search

CPC .. G06F 21/73; G06F 21/75–755; G06F 21/76; G06F 21/86–87

See application file for complete search history.

(56) References Cited

U.S. PATENT DOCUMENTS

2002/0124178 A1* 9/2002 Kocher .................... G09C 1/00 713/193
2019/0312739 A1* 10/2019 Koenig ................... G06F 21/72

FOREIGN PATENT DOCUMENTS

WO WO-2022028932 A1 * 2/2022 .......... A61M 11/042

* cited by examiner

*Primary Examiner* — Kevin Bechtel
(74) *Attorney, Agent, or Firm* — KENJA IP LAW PC

(57) ABSTRACT

A device security shield structure wherein a security wiring structure 4, comprising wiring 3 or the like and having a unique characteristic, is provided on an upper portion of a device 2 on a substrate 1, and this wiring structure 4 is covered with a synthetic resin 5, creating a configuration where it cannot be removed or be subject to external operational analysis measurement unless the wiring structure 4 is damaged. The acquisition of said unique characteristic is made an operating condition of the device 2, whereby if the wiring structure 4 is damaged or removed, the device 2 does not operate and operational analysis becomes impossible.

5 Claims, 2 Drawing Sheets

DEVICE SECURITY SHIELD STRUCTURE

TECHNICAL FIELD

The present invention relates to a device security shield structure that can enhance reverse engineering resistance by preventing operating signal information and circuit wiring information from being acquired in an unauthorized manner through operational analysis of a device mounted on a substrate, such as a Field Programmable Gate Array (FPGA), which is an integrated circuit whose circuit wiring information is programmable by a user, or a ROM that stores said circuit wiring information.

BACKGROUND ART

For example, an FPGA, which is a device mounted on a substrate, is an integrated circuit that generates a desired logic circuit by performing programming to provide circuit wiring information, such as position information and wiring information of elements constituting a circuit, and inputting this information. Specifically, it has a configuration, for example, comprising a standard chip on which a large number of general-purpose logic circuits are arranged in a lattice, and a user, in order to realize a desired integrated circuit, programs necessary predetermined circuit wiring information into this FPGA and inputs it, thereby connecting the general purpose logic circuits to generate a logic circuit having a predetermined function, which allows for the design and manufacture of equipment in a short period and is a very advantageous device for equipment development.

Furthermore, for example, in an SRAM-type FPGA, the circuit wiring information necessary to obtain a desired integrated circuit is programmed and stored in an SRAM area provided therein, and it operates according to this program. Since this circuit wiring information needs to be retained even when the power is turned off, a non-volatile memory (ROM) is provided externally, and the circuit wiring information is automatically loaded from this ROM to the FPGA at power-on to operate.

That is, such an FPGA is a device that can generate a desired integrated circuit capable of sequentially performing complex logical operations by loading the circuit wiring information from the ROM at the start of operation to perform a desired function and writing it into the SRAM within the FPGA, thereby controlling a switch matrix and setting the functions of logic circuit blocks.

However, a conventional FPGA uses a ROM that stores circuit wiring information as described above and loads the circuit wiring information from the ROM at power-on for use. The contents of this ROM can be easily read by a third party using a ROM writer or the like, and the function of the FPGA can be used in an unauthorized manner by using a ROM copied in this way.

Therefore, in order to prevent circuit wiring information from being acquired in an unauthorized manner through internal analysis of devices such as FPGAs and ROMs mounted on such a substrate and to enhance reverse engineering resistance, advanced encryption technologies have also been developed that are incorporated into these FPGAs and ROMs.

For example, in order to prevent the ROM from being removed and its internal data from being read, not only is the ROM data encrypted, but it is also encrypted using the unique ID of the FPGA as a key, and configurations have been developed such that the circuit wiring information is not expanded even if connected to another FPGA.

On the other hand, even if data is encrypted in this way, there is a risk that operating signal information and circuit wiring information may be acquired in an unauthorized manner by performing operational analysis that analyzes the operating signals and their operation. Preventing this and achieving a higher level of reverse engineering resistance requires a more expensive front-end process, which increases costs. Therefore, the security functions of such FPGAs are still not sufficient, and it is not a technology that can be retrofitted to existing devices (e.g., such FPGAs), resulting in poor versatility.

SUMMARY OF THE INVENTION

Problem to be Solved by the Invention

The present invention aims to solve the security problems that implementation devices such as FPGAs face with a shift in thinking and a technology that can be realized at a low cost, and to provide a groundbreaking and extremely practical device security shield structure that can achieve extremely high reverse engineering resistance with an inexpensive implementation technology, is highly versatile with a technology that can also be post-processed on existing devices, can flexibly shield multiple devices, and facilitates social implementation.

Means for Solving the Problem

The gist of the present invention will be described with reference to the attached drawings.

The present invention is characterized in that a security wiring structure 4 having a unique characteristic by means of wiring 3 or wired passive elements or active elements is provided on an upper portion of a device 2 mounted on a substrate 1, the device 2 and the wiring structure 4 are covered with a synthetic resin 5, and a wiring position of the wiring structure 4 is configured to be not visually recognizable from an outside by the covering synthetic resin 5, the device 2 is configured to be not removable or not subject to external operational analysis measurement unless the wiring structure 4 is damaged, and an acquisition of the unique characteristic based on the wiring 3 or the wired passive elements or the active elements of the wiring structure 4, or an acquisition of a combination of the unique characteristic of the wiring structure 4 and a characteristic of the device 2 is made an operating condition of the device 2, and a security function is provided whereby the device 2 does not operate and operational analysis becomes impossible if the wiring structure 4 is damaged or removed.

Further, the device security shield structure is characterized in that the device 2 is an FPGA, which is an integrated circuit programmable with circuit wiring information by a user, or a ROM in which the circuit wiring information of this FPGA is written.

Further, the device security shield structure is characterized in that at a start of operation of the device 2, in a case where the wiring structure 4 is damaged or removed and the unique characteristic cannot be acquired, the security function is provided whereby the device 2 does not operate, and it is configured such that operational analysis of the device 2 cannot be performed and acquisition of operating signal information or circuit wiring information of the device 2 becomes impossible.

Further, the device security shield structure is characterized in that the wiring structure 4 comprises the wiring 3 or the wired passive elements or the active elements that are circuitously wired on the upper portion of the device 2 and is configured to be covered with the synthetic resin 5 and integrated with the device 2, wherein a signal output from between predetermined terminals of this wiring 3 or the passive elements or the active elements, or a combination of signals output from between different terminals is made the unique characteristic, and the acquisition of this unique characteristic, or the acquisition of the combination of the unique characteristic of the wiring structure 4 and the characteristic of the device 2 is made the operating condition of the device 2.

Further, the device security shield structure is characterized in that the wiring structure 4 is configured to be wired on the upper portion of the device 2 in a wavy line shape that is circuitously routed vertically and horizontally and repeats convex and concave shapes having a height difference of 50 μm or more.

Further, the device security shield structure is characterized in that the wiring 3 of the wiring structure 4 is configured to be circuitously wired vertically and horizontally on the upper portion of the device 2 and is covered with the synthetic resin 5 such that a wiring position or the wired passive elements or the active elements are not visually recognizable from the outside, and is set to be of a material that is damaged by a chemical agent that removes this synthetic resin 5.

Effects of the Invention

Because the present invention is configured as described above, it becomes a groundbreaking and extremely practical device security shield structure that can achieve extremely high reverse engineering resistance with an inexpensive implementation technology, is also highly versatile with a technology that can be post-processed on existing devices, can flexibly shield multiple devices, and facilitates social implementation.

DESCRIPTION OF EMBODIMENTS

Figure 1:
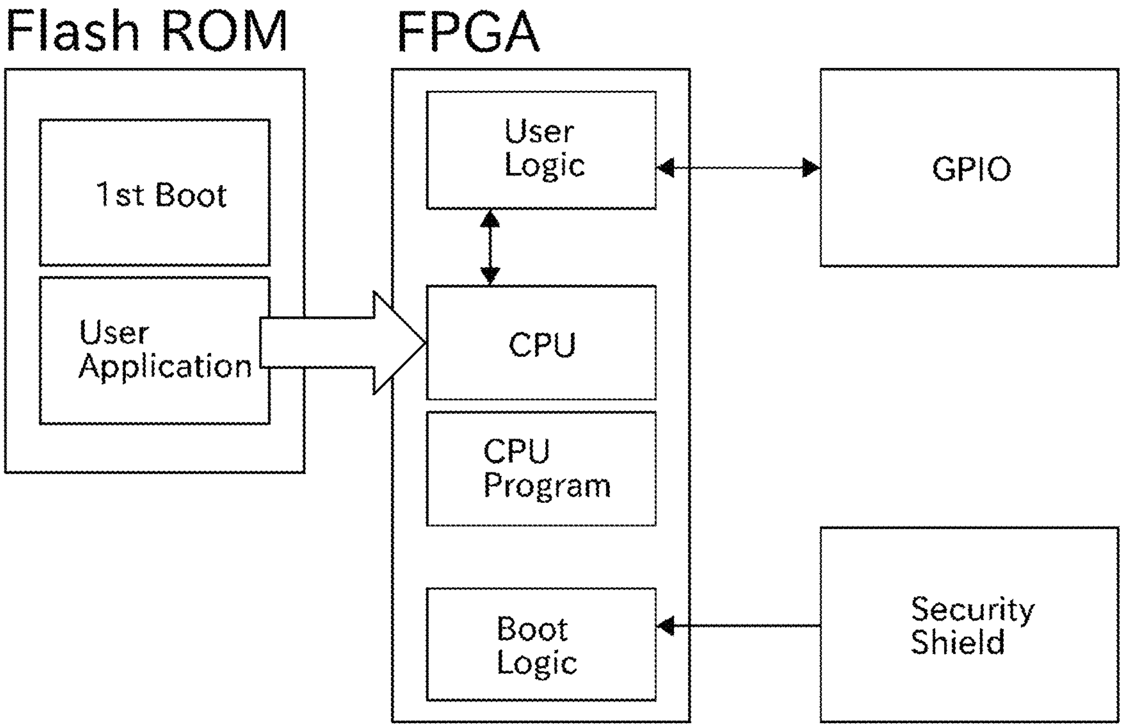
FIG. 1 is an operation explanatory chart diagram of the present embodiment.
Figure 2:
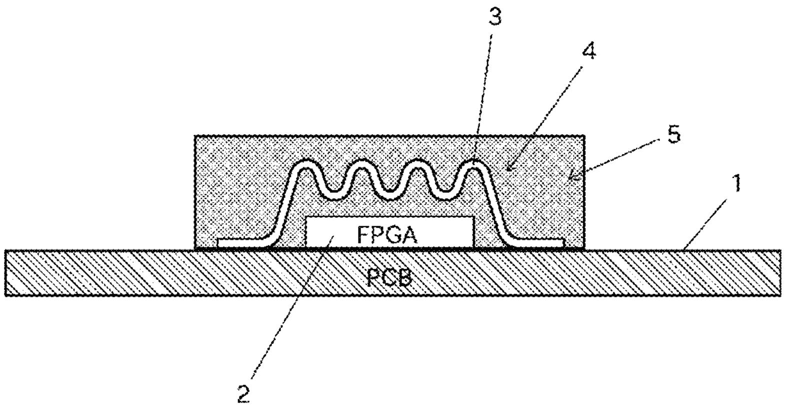
FIG. 2 is an explanatory cross-sectional view showing a schematic configuration of the present embodiment.
Figure 3:
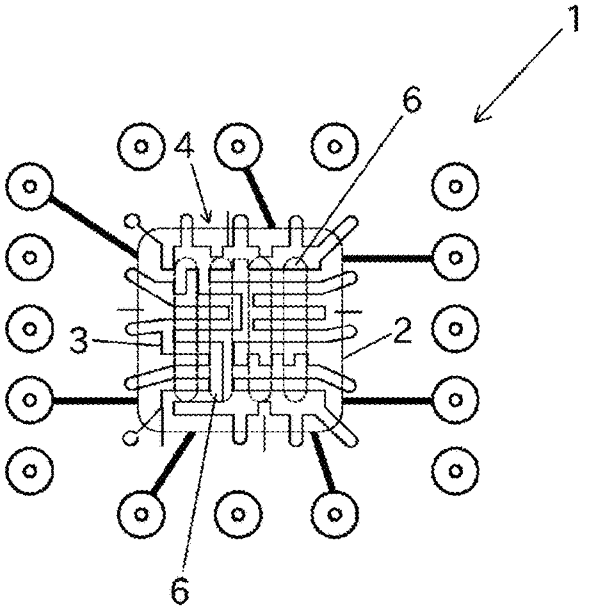
FIG. 3 is an explanatory perspective view of an implementation state before being shielded with a synthetic resin of the present embodiment.
Figure 4:
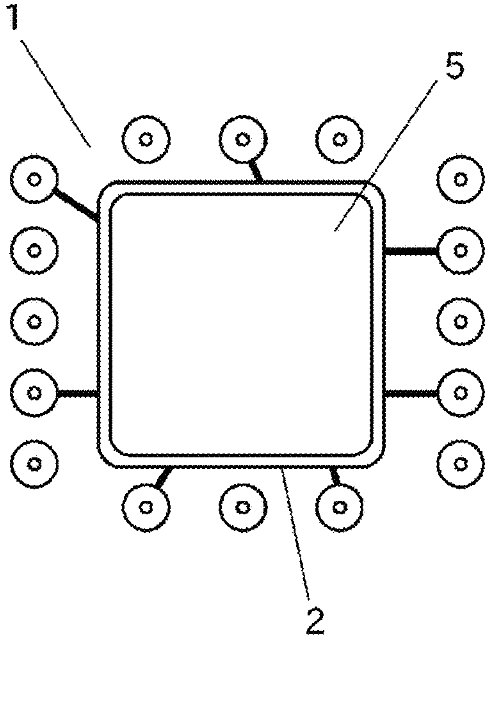
FIG. 4 is an explanatory perspective view of an implementation state after being shielded with a synthetic resin of the present embodiment.

A preferred embodiment of the present invention will be briefly described based on the drawings, showing the operation of the present invention.

The present invention has a configuration in which a security wiring structure 4 that fulfills a security function is provided on an upper portion of a device 2 mounted on a substrate 1, and is configured such that an acquisition of the unique characteristic based on wiring 3 or wired passive elements or active elements of this wiring structure 4, or an acquisition of a combination of the unique characteristic of this wiring structure 4 and a characteristic of the device 2 becomes an operating condition of the device 2.

Therefore, it is configured such that if the wiring structure 4 is damaged or removed, the device 2 does not operate, and operational analysis becomes impossible.

Further, the present invention integrates the device 2 and the wiring structure 4 by covering them with a synthetic resin 5, and furthermore, by making this synthetic resin 5, for example, an opaque resin, it is configured such that a wiring position of this wiring structure 4 or the passive elements or active elements are not visually recognizable from the outside.

That is, the present invention applies a security shield structure that shields the device 2 to be security-protected with a wiring structure 4 comprising wiring 3 or wired passive elements or active elements that will fulfill a security function, and a synthetic resin 5 that covers this, so that this shielded device 2 is configured to be not removable or not subject to external operational analysis measurement unless the wiring 3 or the passive elements or active elements of the wiring structure 4 are damaged.

Specifically, for example, if one attempts to physically remove this synthetic resin 5, since the wiring position of the wiring structure 4 or the passive elements or active elements are not visible, for example, if this wiring 3 is circuitously wired vertically and horizontally, or wired in a wavy shape so as to form a convex-concave shape in the vertical direction, at least a part of this wiring 3 will almost certainly be damaged and disconnected.

Also, for example, if one attempts to chemically dissolve and remove it using a chemical agent, if the material of the wiring 3 is set to a material that reacts together with this synthetic resin 5, then again, at least a part of this wiring 3 will almost certainly be damaged and disconnected.

Also, for example, even if one attempts to insert a measurement probe from the outside for operational analysis of the device 2 while leaving this synthetic resin 5 as is, since the wiring position or the passive elements or active elements are not visible, for example, if this wiring 3 is circuitously wired vertically and horizontally, or wired in a wavy shape so as to form a convex-concave shape in the vertical direction, at least a part of this wiring 3 will almost certainly be damaged and disconnected.

Therefore, if one tries to access this device 2 for internal analysis and perform operational analysis, the wiring 3 or the passive elements or the active elements will almost certainly be damaged, and as a result, unauthorized operational analysis becomes impossible. That is, it makes opening analysis difficult and is resistant to both physical reverse engineering analysis and chemical reverse engineering analysis. By having such a security shield structure equipped with this security function, operational analysis becomes impossible, and furthermore, for example, by combining it with existing encryption technology, an extremely high security shield with reverse engineering resistance can be realized by such a simple wiring implementation and molding of the synthetic resin 5.

To explain further, the present invention is configured such that a unique characteristic based on the wiring 3 of this wiring structure 4, for example, a combination of signals output from between predetermined terminals or between different terminals of this wiring 3 or the passive elements or active elements, is made a unique characteristic, and this unique characteristic is used as a unique operating key for the device 2 to boot, expand the program of circuit wiring information, and operate. That is, by configuring it such that the unique characteristic based on the wiring 3 or the wired passive elements or the active elements of this wiring structure 4 becomes the operating condition of the device 2, if this wiring structure 4 is damaged, the unique characteristic cannot be acquired, so the device 2 does not operate, and unauthorized operational analysis is impossible. Therefore, as mentioned above, a security shield structure equipped with a high security function with reverse engineering resistance can be easily constructed.

That is, in the present invention, at the start of operation of the device 2, in a case where the wiring 3 or the wired passive elements or active elements of the wiring structure 4 are damaged or removed and the unique characteristic cannot be acquired, the device 2 will not operate. Therefore, operational analysis of the device 2 cannot be performed, and acquisition of the operating signal information and circuit wiring information of the device becomes impossible. Thus, as mentioned above, a security shield structure equipped with a high security function with reverse engineering resistance can be easily constructed.

Therefore, the present invention does not require performing more expensive encryption processing to enhance reverse engineering resistance in order to prevent unauthorized operational analysis, can achieve extremely high reverse engineering resistance with an inexpensive implementation technology, is highly versatile with a technology that can also be post-processed on existing devices, can flexibly shield multiple devices, and facilitates social implementation, thus becoming a groundbreaking device security shield structure.

EXAMPLE

A specific example of the present invention will be described based on the drawings.

This embodiment has a configuration in which a security wiring structure 4, having a unique characteristic based on wiring 3, is provided in a stacked state on an upper portion of two devices 2—an FPGA, which is an integrated circuit programmable with circuit wiring information by a user, and a ROM in which the circuit wiring information of this FPGA is written—by routing the wiring 3, and furthermore, this wiring structure 4 is covered from its upper side with an opaque synthetic resin 5 and integrated, so that the wiring position of this wiring structure 4 is configured to be not visually recognizable from the outside by this covering opaque synthetic resin 5. This makes the device 2 configured to be not removable from the substrate 1 or not subject to external operational analysis measurement unless the wiring structure 4 is damaged. Note that while a plurality of devices 2 may be collectively covered by the wiring structure 4 and the synthetic resin 5 in this manner, a configuration where the device 2 to be protected is individually and singly covered is also acceptable. Also, the device 2 is not limited to an FPGA or ROM; for example, a one-chip microcomputer may be used as the device 2 and be covered.

In this embodiment, the acquisition of the unique characteristic based on the wiring 3 of the wiring structure 4, or the acquisition of a combination of the unique characteristic of this wiring structure 4 and a characteristic of the device 2 is made an operating condition of the device 2, and it is configured with a security function whereby if this wiring structure 4 is damaged or removed, the device 2 does not operate, and operational analysis of the device 2 becomes impossible. Note that, in this embodiment, the configuration is such that the unique characteristic is acquired by a combination of outputs between various terminals of the wiring of the wiring structure 4 which is wired so as to form a concave-convex shape on the upper portion of the device 2. However, the wiring structure 4 may be constituted by wiring combined not only with wires but also with passive elements or active elements, and the unique characteristic may be acquired by a combination of outputs between predetermined terminals thereof.

Specifically, the data in the FPGA and ROM, which are the device 2, is encrypted, and as described above, at the start of operation of this device 2, if the wiring structure 4 is damaged or removed and the unique characteristic cannot be acquired, the device 2 is covered by a security shield equipped with the security function that prevents the device 2 from operating. If one attempts to perform operational analysis of the device 2, the wiring structure 4 of this shield is damaged, causing the device 2 not to operate and making operational analysis impossible, thereby preventing unauthorized acquisition of operating signal information and circuit wiring information.

To explain further, the wiring structure 4 of this embodiment is configured with circuit wiring routed on the upper portion of the device 2, and a signal output from between predetermined terminals selected from a multitude of terminals of this wiring 3, or a combination of signals output from between different terminals is made the unique characteristic, which is used as the operating condition (a unique operating key at boot) for the device 2.

Specifically, as described above, the unique characteristic based on the wiring 3 of this wiring structure 4, for example, a combination of signals output from between predetermined terminals of this wiring 3, is made a unique characteristic, and this unique characteristic is configured to be a unique operating key for the device 2 to operate. If this wiring structure 4 is damaged, the unique characteristic cannot be acquired, so the program of circuit wiring information cannot be loaded from the ROM, and therefore the device 2 does not operate. Furthermore, during operation, for example, the program is erased, and it is configured to be unable to operate again.

For example, when starting the operation of this FPGA, first, if the unique characteristic of this wiring structure 4 can be detected and acquired, the user program from the ROM is loaded into the FPGA and expanded to start operation. After this user program is expanded, the initial boot program disappears from the FPGA, and furthermore, even during program operation, the state of this wiring structure 4 is periodically checked to monitor for abnormalities. Note that, depending on the settings, if an abnormality occurs, even during operation, functions may be limited, a certain state may be maintained, the program may disappear, or it may be configured to be unable to operate again.

In addition to this security function, in this embodiment, the data within the device 2 is encrypted using existing encryption technology, creating a configuration in which circuit wiring information and the like cannot be acquired in an unauthorized manner through internal analysis.

Therefore, with this security shield structure, if this shield is broken, that is, if the wiring 3 of the wiring structure 4 is disconnected, the device 2 will at least not operate and it will become impossible to stop its operation or to make it operate again. Consequently, unauthorized operational analysis also becomes impossible, and an extremely high security function with reverse engineering resistance is exhibited.

The wiring structure 4 of this embodiment is connected to the device 2 on its upper portion, is circuitously wired vertically and horizontally having a multitude of output terminals, and is wired in a wavy line shape that repeats convex and concave shapes having a height difference of 50 μm or more.

Further, in this embodiment, to facilitate such wiring, swelled portions 6 are formed at intervals on the upper portion of the device 2 by the synthetic resin 5, and by routing the wiring over these swelled portions 6, it is configured to be easily wired in a wavy shape with the desired height difference.

This wiring 3 is configured to be wired vertically and horizontally on the upper portion of the device 2 and is covered with the opaque synthetic resin 5 so that the wiring position is not visually recognizable from the outside, but it is formed of a material that is damaged by a chemical agent that can dissolve and remove this synthetic resin 5.

Therefore, for example, if one attempts to physically, i.e., mechanically, grind and remove this synthetic resin 5 little by little, the wiring position of the wiring structure 4 is not visible, and moreover, since this wiring 3 is circuitously routed vertically and horizontally, and is also wired in a wavy shape so as to form a convex-concave shape in the vertical direction, at least a part of this wiring 3 will certainly be damaged and disconnected.

Also, for example, even if one attempts to chemically dissolve and remove it using a chemical agent, as mentioned above, since the material of the wiring 3 is set to a material that reacts together with this synthetic resin 5, then again, at least a part of this wiring 3 will certainly be damaged and disconnected.

Also, even if one attempts to insert a measurement probe from the outside for operational analysis of the device 2 while leaving this synthetic resin 5 as is, it is difficult because the wiring position is not visible, and moreover, since this wiring 3 is circuitously routed vertically and horizontally, and is also wired in a wavy shape so as to form a convex-concave shape in the vertical direction, then again, at least a part of this wiring 3 will almost certainly be damaged and disconnected by this measurement probe.

Therefore, if one tries to access this device 2 for internal analysis and perform operational analysis, the wiring 3 will almost certainly be damaged. Thus, a device shield structure equipped with a high security function with reverse engineering resistance, where operational analysis also becomes impossible due to this wiring 3 implementation and the molding of the synthetic resin 5, can be easily realized.

To explain further, in this embodiment, if the synthetic resin 5 is removed or a measurement probe is inserted in an attempt to perform operational analysis, as mentioned above, the user program cannot be loaded and the device does not operate. Even during operation, if an abnormality is detected, such as the wiring 3 being damaged, it is initialized and the program is erased. Furthermore, even if the ROM is replaced, it is configured not to boot due to encryption with the FPGA's unique ID. And as mentioned above, the FPGA's function monitors for abnormal voltage, and if there is an abnormality, it is configured to stop operation, making replacement and operation impossible as well as making operational analysis impossible, thereby further enhancing reverse engineering resistance.

Furthermore, if a large number of terminals for this wiring structure 4 are provided as described above, the unique operating key for operation can be easily changed and set to various values by the combination of these selected terminals, and in this respect as well, high reverse engineering resistance can be obtained.

Therefore, in this embodiment, without using a costly front-end process with advanced encryption processing to make operational analysis impossible, the wiring structure 4 that generates a unique key for starting operation, which can be detected and acquired at boot, can be implemented on the device 2 with an inexpensive implementation technology. Also, a security shield equipped with a security function can be provided by retroactively molding the synthetic resin 5 and integrating it. This makes it possible to provide a groundbreaking device security shield structure that is versatile, inexpensive, and can realize high reverse engineering resistance.

Furthermore, it can be realized with a small amount of equipment, the degree of freedom in wiring formation is large, it can be flexibly formed on multiple devices 2, and the setting of various unique operating keys that become the operating conditions can also be easily changed.

It should be noted that the present invention is not limited to this embodiment, and the specific configurations of each constituent element can be designed as appropriate.

REFERENCE SIGNS LIST

1 Substrate
2 Device
3 Wiring
4 Wiring Structure
5 Synthetic Resin
6 Swelled Portion

The invention claimed is:

1. A substrate-mounted device provided with a device security shield by a wiring structure, the substrate-mounted device comprising:

a security wiring structure provided on an upper portion of a device mounted on a substrate, the security wiring structure outputting a unique characteristic to the device by means of wiring connected to the device, the wiring optionally including passive elements or active elements, wherein the device and the wiring structure are covered with an opaque synthetic resin;

the wiring structure is configured such that a wiring position of the wiring or a placement position of the passive elements or the active elements of the wiring structure is not visually recognizable from an outside by the covering opaque synthetic resin, the wiring structure comprises the wiring, which is circuitously wired vertically and horizontally on the upper portion of the device and wired in a wavy shape so as to have vertical unevenness, and optionally comprises the passive elements or the active elements wired with the circuitously and wavily wired wiring, the wiring structure and optional wiring is configured to output the unique characteristic to the device and is integrated with the device by being covered with the opaque synthetic resin, the wiring is configured to be damaged if the device is removed from the substrate, and the wiring is configured to be damaged by a measurement probe if the measurement probe is inserted from an outside to perform an operational analysis measurement of the device, wherein the wiring structure is configured such that the unique characteristic comprises a signal output from between predetermined terminals selected from a multitude of terminals of the wiring and the optional passive elements or the active elements, or comprises a combination of signals output from between different terminals of the multitude of terminals, an acquisition by the device of the unique characteristic of the wiring structure, or an acquisition by the device of a combination of the unique characteristic of the wiring structure and a characteristic of the device, becomes an operating key for an acquisition of operating signal information or for an acquisition of circuit wiring information, and thereby becomes an operating condition of the device, and a device security shield by the wiring structure is provided that has a security function whereby, if the wiring structure is damaged or removed, the device cannot acquire the operating key for the acquisition of the operating signal information or the acquisition of the circuit wiring information and cannot operate, thereby making operational analysis of the device impossible.

2. The substrate-mounted device provided with a device security shield by a wiring structure according to claim 1, wherein the device is a Field Programmable Gate Array (FPGA), which is an integrated circuit programmable with circuit wiring information by a user, or a Read Only Memory (ROM) in which the circuit wiring information of the FPGA is written, and is configured to be able to acquire the circuit wiring information and operate by acquiring the operating key comprised of the unique characteristic.

3. The substrate-mounted device provided with a device security shield by a wiring structure according to claim 1, wherein the device security shield by the wiring structure is provided that has the security function whereby, at a start of operation of the device, in a case where the wiring structure is damaged or removed and the operating key comprised of the unique characteristic cannot be acquired by the device, the device does not operate, thereby making operational analysis measurement of the device impossible and making acquisition of the operating signal information or circuit wiring information of the impossible.

4. The substrate-mounted device provided with a device security shield by a wiring structure according to claim 1, wherein the wiring structure is configured to be wired on the upper portion of the device in a wavy line shape that is circuitously routed vertically and horizontally and repeats convex and concave shapes having a height difference of 50 μm or more.

5. The substrate-mounted device provided with a device security shield by a wiring structure according to claim 1, wherein the wiring be is formed of a material that is damaged by a chemical agent that removes the opaque synthetic resin, such that when removing the opaque synthetic resin that covers the device and the wiring structure by using said chemical agent, the wiring is damaged.

* * * * *